March 18, 1924.

E. A. FREEMAN

BARBECUE PIT

Filed Aug. 24, 1923

Inventor
Edward A. Freeman.
by Marks Annesnay
Attorney

March 18, 1924.

E. A. FREEMAN

BARBECUE PIT

Filed Aug. 24, 1923

Inventor,
Edward A. Freeman,
by Franks Appleman.
Attorney

Patented Mar. 18, 1924.

1,486,875

UNITED STATES PATENT OFFICE.

EDWARD A. FREEMAN, OF JACKSON, TENNESSEE.

BARBECUE PIT.

Application filed August 24, 1923. Serial No. 659,172.

*To all whom it may concern:*

Be it known that I, EDWARD A. FREEMAN, a citizen of the United States of America, and resident of Jackson, in the county of Madison and State of Tennessee, have invented certain new and useful Improvements in Barbecue Pits, of which the following is a specification.

This invention relates to stoves, furnaces and the like, and has particular reference to a barbecue pit intended as a fuel saving device and as a convenient means for supporting the meat to be roasted.

It is an object of this invention to produce a barbecue pit of the character indicated which will operate as a fuel saving device and prevent undue or abnormal smoking of the meat while it is being cooked.

It is a further object of the invention to produce a meat supporting grid in such relation to the fire as to subject the meat to the action of the heat of the fire, without exposing it unduly to smoke which is a part of the products of combustion, as the said products of combustion pass from the furnace or fire pit to the atmosphere exteriorly of the apparatus.

It is a further object of this invention to produce a portable barbecue pit having the advantages stated, said device being of comparatively inexpensive construction.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views and in which,—

Figure 1:
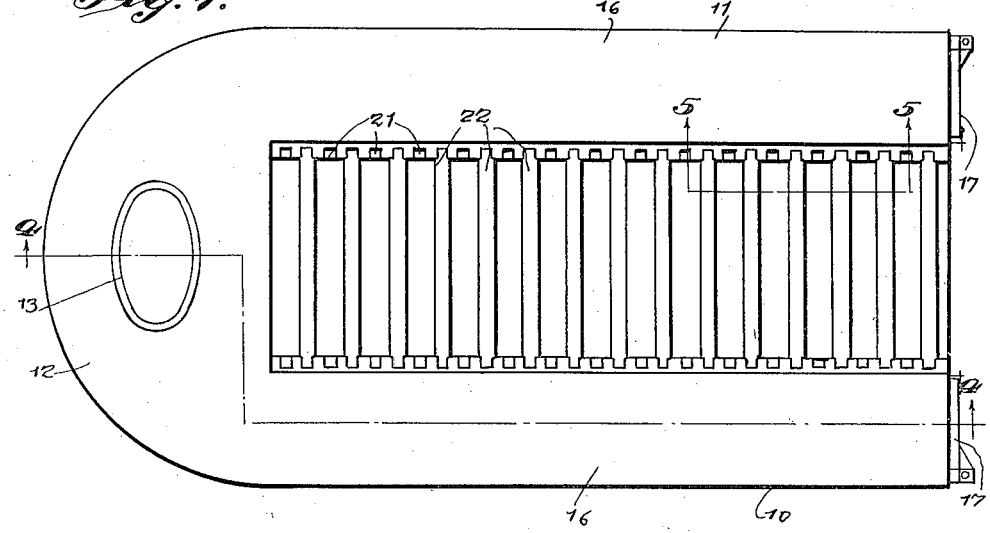
Figure 1 illustrates a plan view of a barbecue pit embodying the invention.
Figure 2:
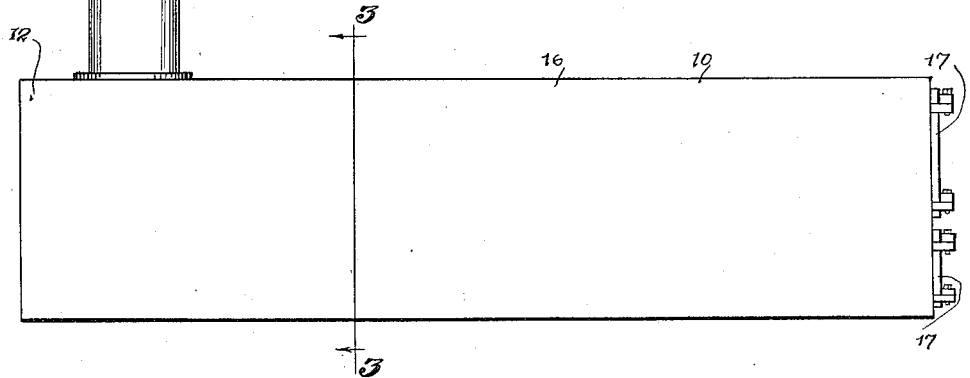
Figure 2 illustrates a side elevation thereof.
Figure 3:
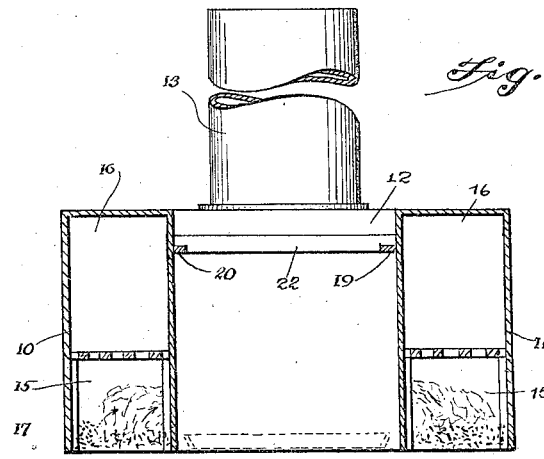
Figure 3 illustrates a sectional view on the line 3—3 of Figure 2.
Figure 4:
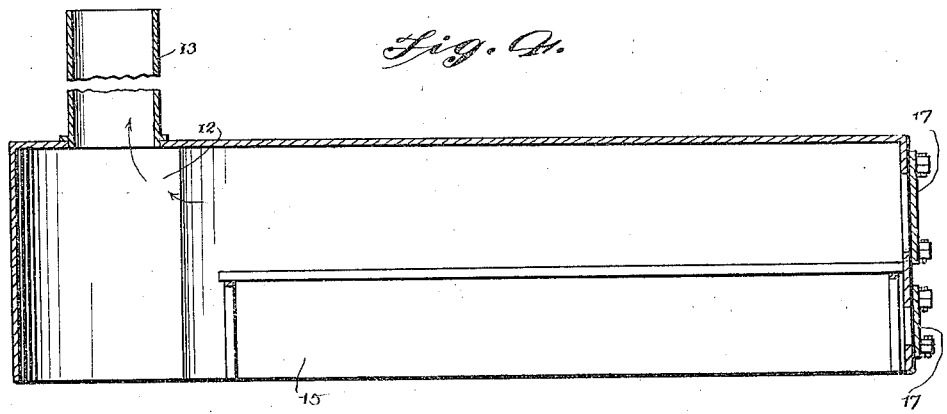
Figure 4 illustrates a sectional view on the line 4—4 of Figure 1.
Figure 5:
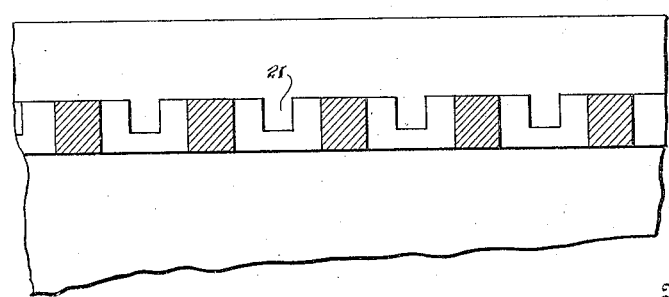
Figure 5 illustrates a sectional view on the line 5—5 of Figure 1.

In these drawings, there is shown one embodiment of the invention in which there are two longitudinally disposed furnace sections or housings 10 and 11 in spaced relation to each other which extend from and communicate with a drum or head 12 from which a smoke pipe 13 rises for carrying off the products of combustion after they have circulated in a manner to be presently explained.

Each furnace section has a horizontal grate and the chamber 15 below each grate may be regarded as a pit for live coals which will be dislodged from the upper chamber 16 during the firing process. The products of combustion will, therefore, pass from the upper chambers into the pipe or smoke stack 13 and will be discharged from the furnace without contaminating the meat being cooked whereas the live coals which will be dislodged from the firing chambers will fall into the pit for live coals and they can be removed therefrom and placed in the space between the furnace sections under the grids for supporting meat to be cooked.

Each chamber is preferably provided with a door 17 at the end for supplying fuel to the upper chamber and for removing live coals from the lower chamber.

The grid that supports the meat is preferably formed of two rails 19 that may be secured in any desired way to the outer surfaces of the inner walls of each furnace section, and the rails are preferably provided with a plurality of seats or notches 21, into which the ends of the grid or grate bars 22 may rest. It is possible by reason of this arrangement of parts to increase or diminish the number of bars in order to expose the meat being cooked, to a greater or less extent, to the fire and heat under the bars.

It is the purpose of the inventor that the pit shall be constructed of sheet metal or casting of proper gage to withstand the temperature necessary for cooking the meat, without adding unduly to the weight of the device as it is the purpose of the inventor, as stated, that the pit shall be portable in order that it may be employed at different locations.

I claim—

1. In a barbecue pit, furnace sections arranged longitudinally and in spaced relation to each other, a head with which the said furnace sections communicate, a stack rising from the head, a horizontal grate in each furnace section, and a grid for supporting meat in the space between the furnace sections.

2. In a portable barbecue pit, furnace sections extending parallel and in spaced relation to each other, a horizontal grate in each furnace section dividing each section into a firing chamber and a pit for live coals, and a grid supported in the space between the furnace sections.

EDWARD A. FREEMAN.